April 21, 1970 R. H. MARTIN 3,507,007

DIFFERENTIAL PRESSURE PLASTIC FORMING EQUIPMENT

Filed May 8, 1967 6 Sheets-Sheet 1

INVENTOR.
RAYMOND H. MARTIN
BY

April 21, 1970 R. H. MARTIN 3,507,007
DIFFERENTIAL PRESSURE PLASTIC FORMING EQUIPMENT Filed May 8, 1967 6 Sheets-Sheet 3

INVENTOR.
RAYMOND H. MARTIN
BY

April 21, 1970   R. H. MARTIN   3,507,007
DIFFERENTIAL PRESSURE PLASTIC FORMING EQUIPMENT
Filed May 8, 1967   6 Sheets-Sheet 6

INVENTOR.
RAYMOND H. MARTIN
BY

United States Patent Office 3,507,007
Patented Apr. 21, 1970

3,507,007
DIFFERENTIAL PRESSURE PLASTIC FORMING EQUIPMENT
Raymond H. Martin, Beaverton, Mich., assignor to Brown Machine Company of Michigan, Inc., a corporation of Michigan
Filed May 8, 1967, Ser. No. 636,913
Int. Cl. B29c 17/00
U.S. Cl. 18—19  22 Claims

ABSTRACT OF THE DISCLOSURE

Differential pressure plastic forming machinery comprising: a female mold assembly having a plurality of mold cavities, a male mold assembly having plug assist members in alignment with the mold cavities, means for supporting a deformable thermoplastic web between the mold assemblies, means for relatively moving the mold assemblies into mated relationship, a reduced thickness lip-forming squeezing ring for each of the plug assist members, a temperature controlling plate intermediate the ends of the plug assist members surrounding the squeezing rings, and means for creating a differential pressure on opposite sides of the web.

---

This invention relates to differential pressure plastic sheet forming equipment for forming relatively deep parts in a heated, deformable synthetic plastic sheet and more particularly to certain new and useful improvements in the mold assemblies thereof.

It is desirable in the formation of containers such as quart-sized plastic oil cans for motor oils and the like to provide a narrow lateral lip at the top of the relatively rigid can which is of reduced thickness to permit it to be folded down when a metal lid is crimped to the top of the can to seal it. It is further desirable to form the bodies of such cans of material such as polyethylene and polypropylene, which require high molding temperatures and cannot be satisfactorily molded, as rapidly as is economical unless temperatures are maintained within critical limits.

One of the prime objects of the present invention is to provide plastic mold mechanism which enables the formation of cans with such lips in a rapid and efficient production cycle on the order of several seconds duration.

Another object of the invention is to provide plastic mold mechanism incorporating means for preventing ballooning of the material between the male mold plug assist members which is helpful in preventing distortion of the material and permits more material to be taken from the web portions between the mold cavities to contribute to the oil can or other container body walls.

Other objects and advantages of the invention will be pointed out specifically or will become apparent from the following description when it is considered in conjunction with the appended claims and the accompanying drawings, in which:

DRAWINGS

Figure 6:
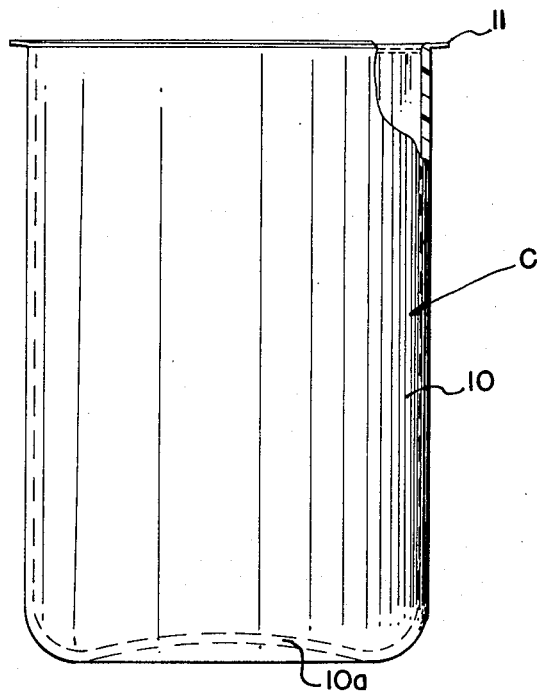
FIGURE 6 is a side elevational view of one of the oil cans formed in the apparatus.
Figure 7:
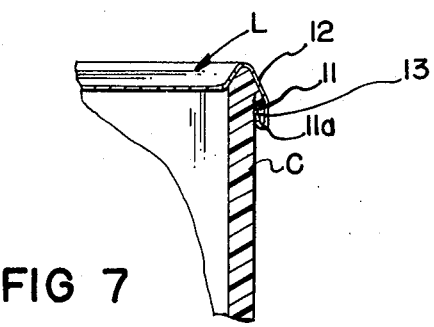
FIGURE 7 is an enlarged fragmentary sectional view of the upper part of an oil can which has its metal lid secured in sealed position thereon, a portion of the can lid being broken away to illustrate the manner in which the lid folds over and the cover or lid crimps thereto.

Referring now more particularly to the accompanying drawings, wherein only a preferred embodiment of the invention is shown, attention is first directed to FIGURES 6 and 7 wherein an oil can or container of a type which may be manufactured in large quantities with the apparatus depicted is illustrated. The oil can generally designated C includes the usual cylindrical body portion 10 which has a bottom wall 10a, and its upper end the container C is formed with a generally laterally extending, narrow circumferential lip or flange 11. It is important to observe that the thickness of the flange 11 is reduced relative to the thickness of the remaining portion of the plastic can C. For example, the body of the container C may be substantially uniformly 70 thousandths of an inch when the thickness of the flange 11 is about 20 thousandths of an inch.

A lid generally designated L is shown in FIGURE 7 fixed in sealed position on the upper end of the container C and it will be observed that the relatively thin flange 11 has been folded back as at 11a and the aluminum lid L has a dependent skirt portion 12 which is folded upwardly as at 13 to engage the folded over rim portion 11. The lid L tightly seals to the plastic can and a rugged endurable throwaway container of very inexpensive nature is provided which can be dropped, for instance, without injury to the can or its contents, the plastic, of course, having some flexibility while being of heavy enough gauge to form a somewhat rigid container body.

Figure 1:
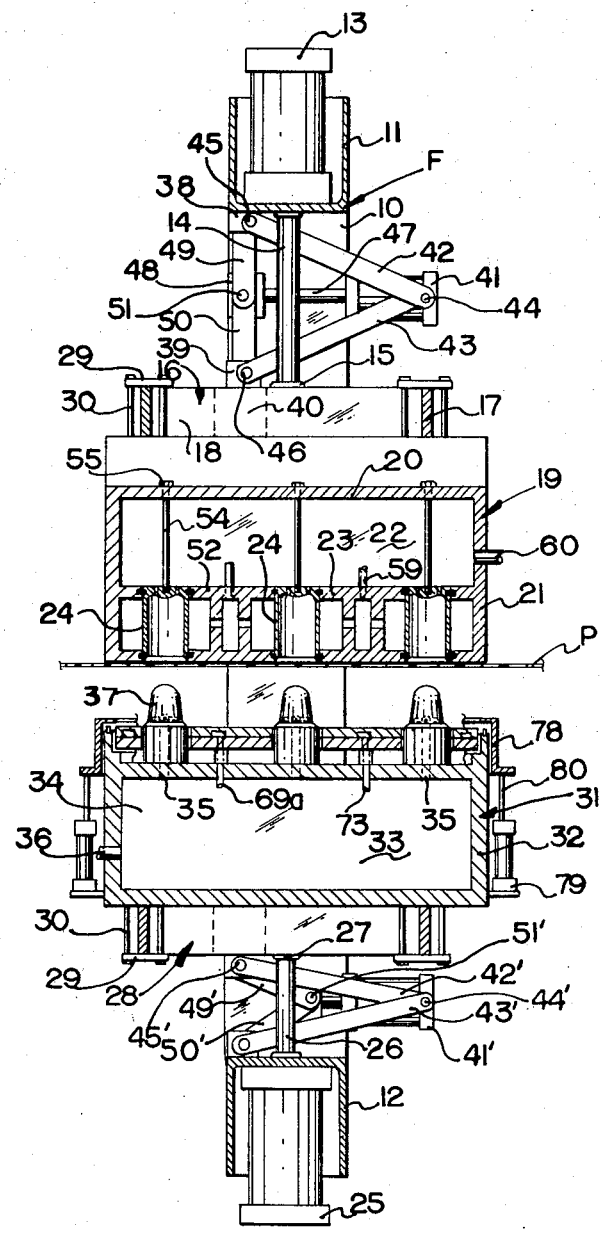
FIGURE 1 is a sectional end elevational view of a differential pressure forming machine which incorporates the mold assemblies of the invention.

FIGURE 1 illustrates differential forming apparatus of the general character shown in the present assignee's copending application Ser. No. 293,959, entitled, "Differential Pressure Forming Machine." In FIGURE 1 a letter F generally designates the frame of the machine, which is shown as having side members 10 connected by an upper channel member 11 and a lower channel member 12. Mounted in fixed position on the upper frame member 11 is a double-acting fluid pressure operated cylinder 13 having a piston rod 14 which is coupled at its lower end as at 15 to an upper platen frame generally designated 16 which may include side members 17 connected by end members 18. Mounted on the platen frame 16 is a female mold vacuum box assembly generally designated 19 which includes an upper wall 20, end walls 21, side walls 22 and a bottom wall 23. Female mold members or liners 24 are supported by the female mold assembly 19 in a manner which will be later described.

The frame portion 12 similarly supports a double-acting fluid pressure operated cylinder 25 having a piston rod 26 which is coupled as at 27 to a lower platen assembly generally designated 28 which, as shown, may be formed similarly to the upper platen assembly 16. Clamp plates 29 on both the upper and lower platen assemblies 16 and 18 may be secured by bolts 30 and, in the case of the lower platen assembly 28, clamp a male mold air box assembly generally designated 31 to the side and end rails 32 and 33, respectively, of the lower platen assembly 28.

Figure 2:
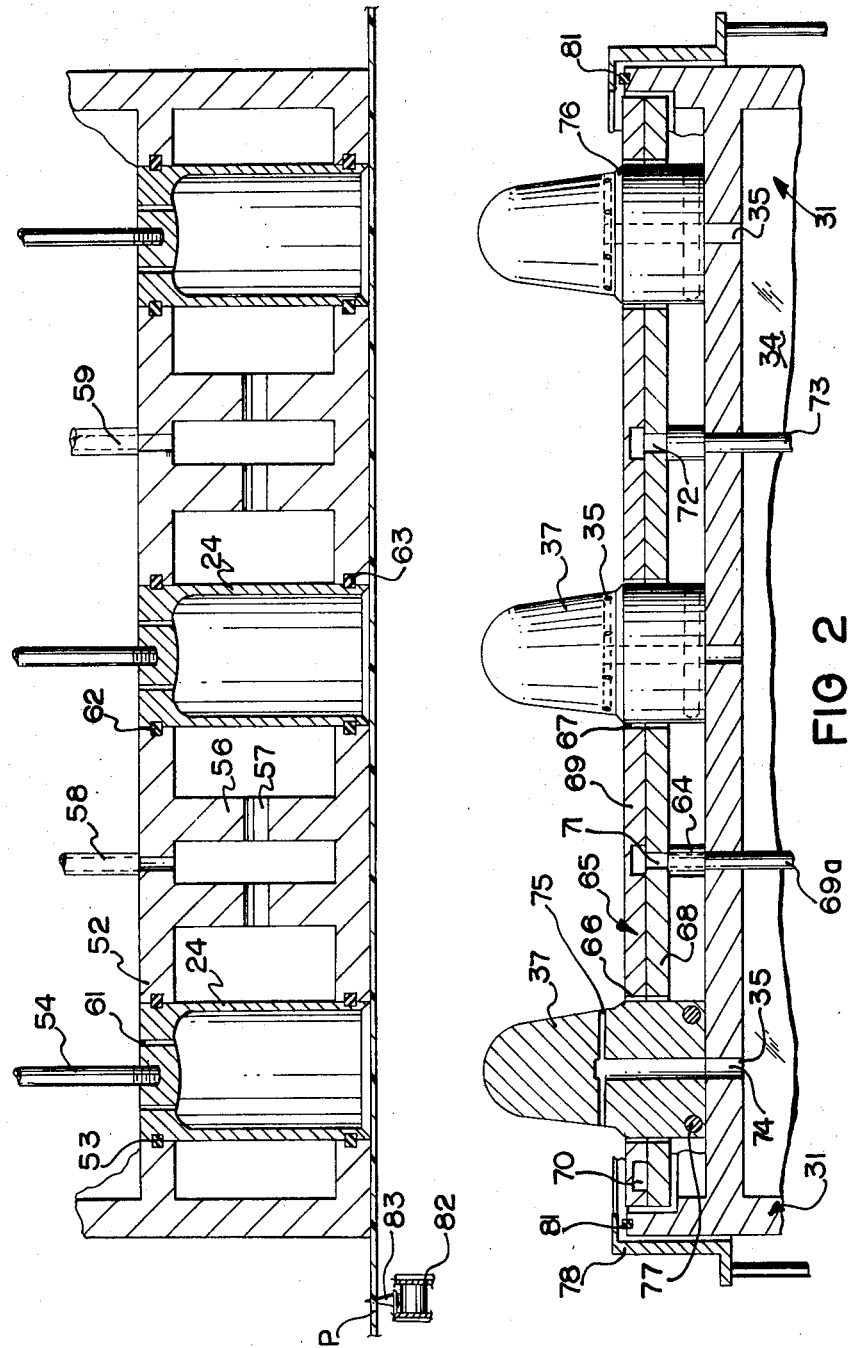
FIGURE 2 is an enlarged fragmentary end elevational view of the mold assemblies particularly illustrating the plug assist members in a withdrawn position.

As FIGURE 2 particularly indicates, the lower air box assembly 31 includes an air manifold or air box 34 having ports 35 therein which assist in the forming operation in the manner described in the aforementioned copending application. An air line 36 may be provided in communication with a suitable source of air under pressure to provide air to the box 34 at the proper time. Also mounted by the air box 34 and in vertical alignment with the female mold members 24 are plug assist members 37 which in the usual manner are employed to initially deform the heated plastic web P and move it into the female mold members 24.

As in the aforementioned application, the forming machine illustrated employs toggle linkage systems for locking the upper and lower mold box assemblies 19 and 31 in sealed forming position and exerting a preloading stress thereon urging the mold assemblies in a direction toward the plastic sheet or web P during the molding operation. Mounted on the upper frame member 11 are support blocks 38 in vertical alignment with support blocks 39 mounted on cross braces 40 provided for the upper assembly 16. A double-acting fluid pressure operated cylinder 41 at each end of the upper platen 16 is supported at its outer end between the blocks 38 and 39 by pairs of straddling toggle lines 42 and 43 which pivotally connect to the cylinder 41 at their converging ends as at 44 and are pivotally connected to the blocks 38 and 39, respectively, by pins 45 and 46. The piston rod 47 of each cylinder 41 connects with a block 48 and each block 48 is pivotally connected to toggle links 49 and 50 by a pivot pin 51. The lower platen assembly includes identical linkage mechanism and identical parts have been given the same numerals except that the numerals have been primed. These parts, accordingly, need not and will not be independently described.

As FIGURES 1 and 2 indicate, the female mold assembly 19 includes an intermediate partition wall 52 having openings 53 within which the female mold inserts 24 are received, the inserts 24 being supported from top wall 20 by rod members 54 having threaded upper ends on which nuts 55 may be received. Depending from the intermediate plate 52 are water channel or tube members 56 having openings 57 which permit water to circulate around the mold inserts 24. A coolant inlet tube 58 and a coolant exit or drain tube 59 may be provided leading from suitable supply and drain elements or from a suitable recirculating unit of the character shown, for example, in U.S. Patent No. 2,994,514. A vacuum tube 60 also connects with the interior of the female mold box 19 in the usual manner, there being vacuum ports 61 leading through the female mold inserts 24 as shown particularly in FIGURE 2. FIGURE 2 also indicates the manner in which the mold inserts 24 may be sealed by upper and lower O-rings 62 and 63, respectively.

Figure 3:
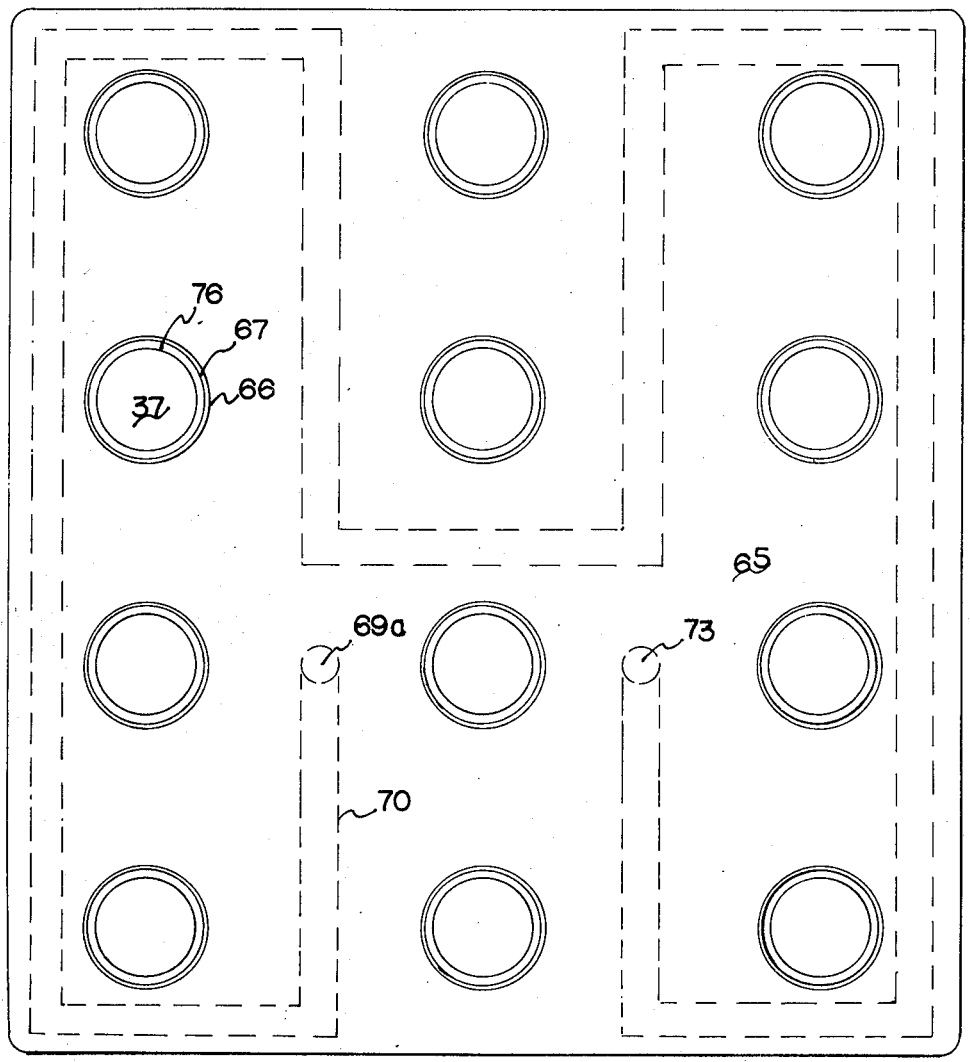
FIGURE 3 is a top plan view of the male mold assembly.

Mounted on the top of the air box 34 are tubular nylon spacer members 64 (FIGURE 2) which supports a cooled plate or plate assembly generally designated 65 in position vertically intermediate the ends of the extending plug assist members 37. The plate assembly 65 has enlarged openings 66 through which the plug assist members 37 extend, there being a circumferential space 67 provided between the marginal walls of openings 66 and the plug assist members 67 as shown. Each plate assembly 65 includes a lower aluminum plate 68 and an upper aluminum plaate within which a serpentine passageway 70 (see FIGURE 3) has been milled. As FIGURE 2 indicates, an opening 71 is bored in the plate 68 and communicates with a coolant inlet tube 69a and an opening 72 is bored in the plate 68 to communicate with a drain tube 73.

The plug assist members 37 may be centrally bored as at 74 to communicate with the air passages 35 and horizontally extending ports 75 may be provided in the plug assist members 37, as shown, in communication with the ports 75 above an annular, axially tapering squeezing surface 76 which is provided on the plug assist members 37 intermediate their ends. Heating means may be provided in each plug assist member 37 to maintain it at a predetermined temperature and, as FIGURE 2 indicates, the heating means may take the form of a conventional heating coil 77.

The usual clamp frame assembly 78 is also provided on the lower platen assembly 31, there being fluid pressure clamping cylinders 79 with piston rods 80 connected to the clamp frame members 78 in the usual manner to provide a pressure seal. A rectangular resilient seal member 81 may be positioned between the clamp frame 78 and the lower mold box 31.

The plastic sheet P may be indexed to a position between the upper and lower mold assemblies by conventional advancing chain apparatus 82 having teeth 83 which pierce the edges of the plastic web P and carry it along. Sheet indexing mechanism of this character is disclosed in the Brown United States Patent No. 3,216,491.

Figure 4:
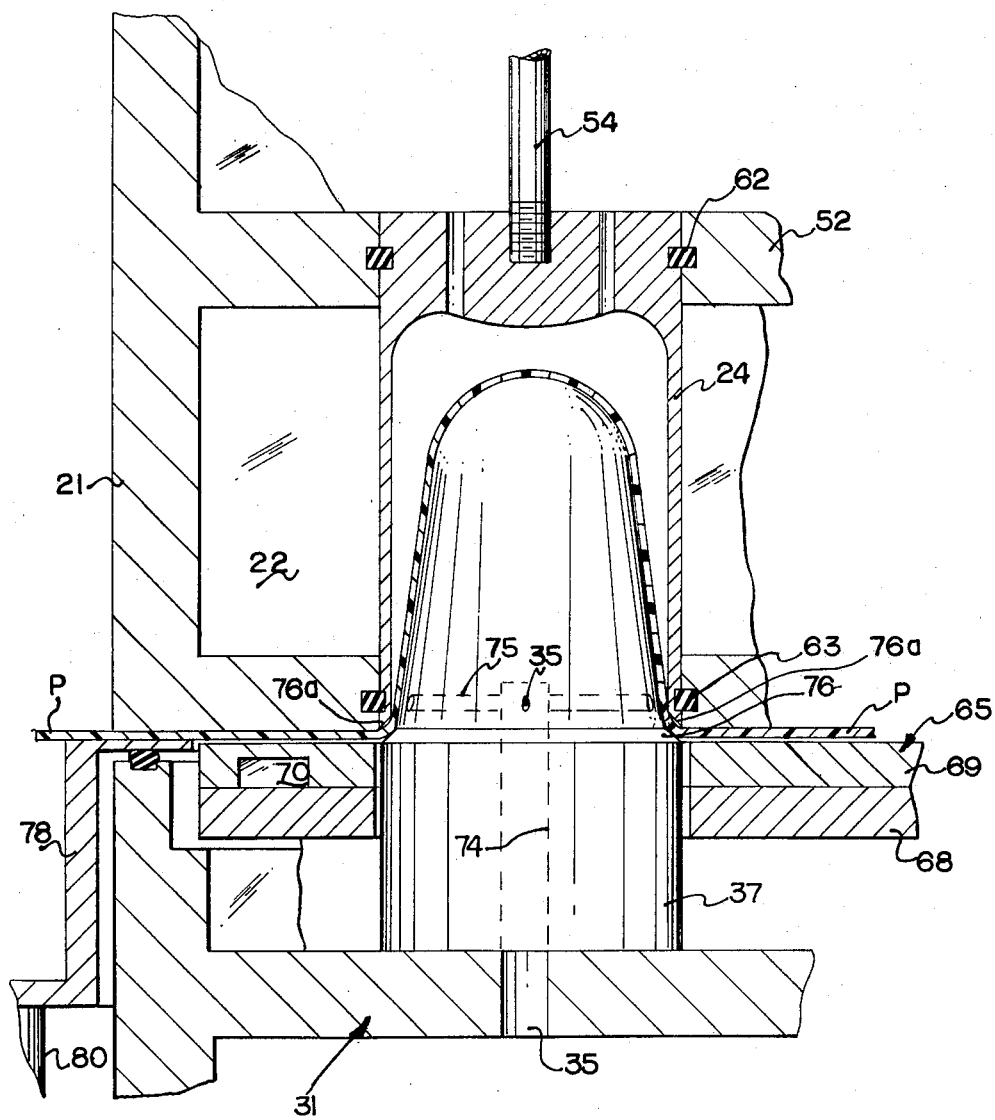
FIGURE 4 is an enlarged fragmentary elevational view of one of the plug assist members showing it moved into a die cavity and in a position in which the squeezing ring surface on the plug assist member has just engaged the plastic sheet.
Figure 5:
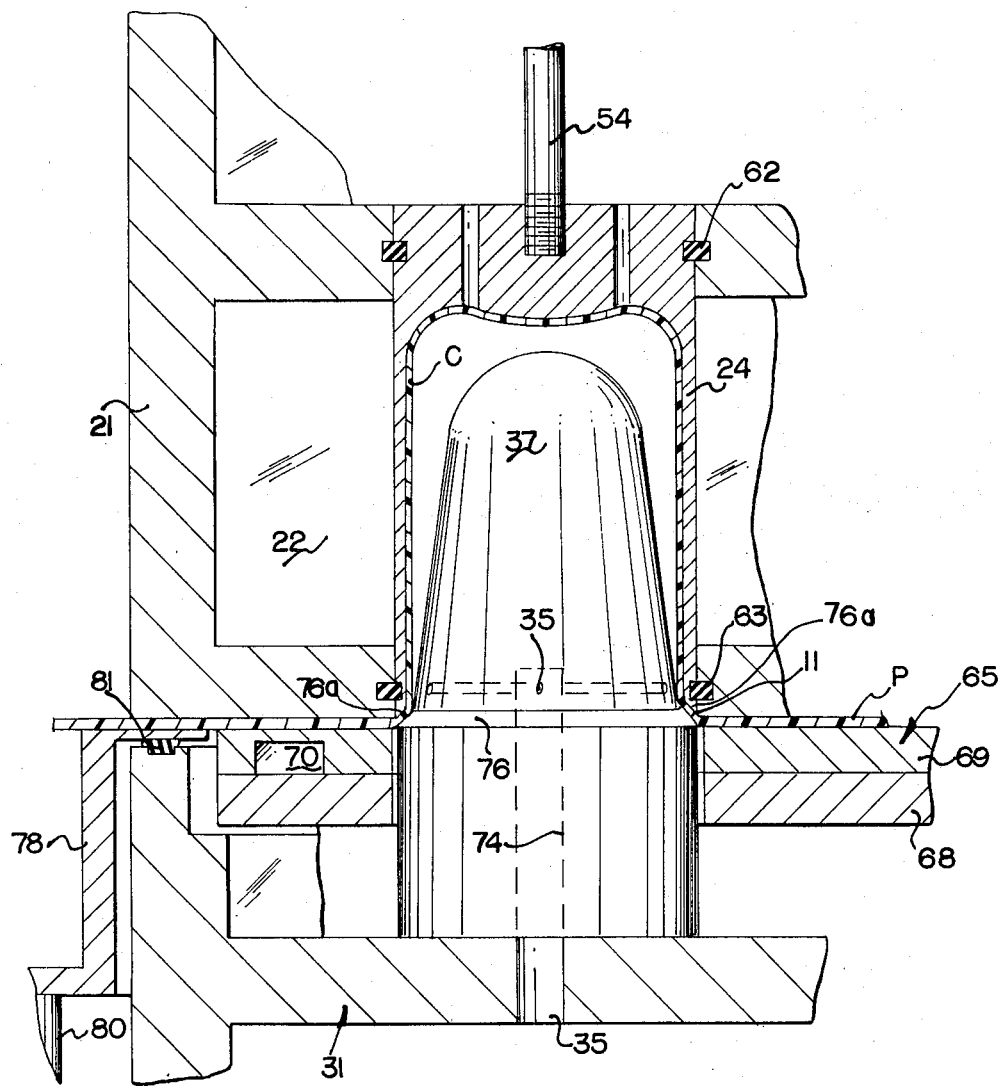
FIGURE 5 is a similar view showing the plug assist member moved to final position and illustrating the manner in which the squeezing ring surface has reduced the thickness of an annular portion of the plastic sheet to form a reduced thickness lip or flange.

In operation, the cylinder 13 is first operated to move the female mold assembly 19 down to a length of plastic sheet P which has been moved into position between the upper and lower mold assemblies by the advancing chains 82. Then cylinder 41 is operated to expand the links 42 and 43 so that toggle links 49 and 50 assume a dead-center position and lock the upper female mold assembly 19 in position against the sheet P. Subsequently, cylinder 25 is operated to move the air box assembly 31 upwardly to engage the clamp frame 78 with the plastic P. As the assembly 31 continues upward movement the cylinders 79 continue to move upwardly relatively to the piston rods 80 and in so doing compass the air in cylinders 79 and tightly clamp the plastic web P between the upper and lower mold assemblies. The plug assist members 37 move into the aligned cavity inserts 24, ballooning portions of the plastic web P up into the female mold inserts 24 in the usual manner. As will later be explained, because the plate 65 prevents downward ballooning of the portions of the plastic web P between the plug assist members 37, a greater portion of plastic can be removed from these portions of the web and is available for the walls of the containers being formed. Near the terminal portion of the upward movement of the lower mold assembly the plug assist squeezing ring surfaces 76 engage annular portions of the plastic, as shown in FIGURE 4, to squeeze it to a reduced thickness in the remainder of their stroke as illustrated in FIGURE 5.

When polystyrene is being processed the plug assists 37 are maintained at a temperature of about 350° F., which is substantially the temperature to which the plastic sheet P is heated. The temperature of the water or other coolant supplied to the female mold through supply line 58 in a typical operation may be about 30° F. and the coolant will pick up enough heat so that when it leaves line 59 it is at a temperature of about 60° F. Water or other coolant supplied to the temperature controlling plate 65 through inlet pipe 69a may be typically at a temperature of 69° F. and enough heat is picked up so that when it leaves through drain pipe or tube 73 it is at a temperature of about 78° F. Typically, the upper surface of plate 65 will be at a temperature of approximately 110° F. The foregoing temperatures may vary somewhat, dependent on the number of cycles per minute which the machine achieves or dependent on the plastic material being processed, and it is to be understood that they are intended to be illustrative only and that other temperatures accomplishing the same results may be employed.

During the time the plug assists 37 are moving into the cavity members 24, the vacuum line 61 may be open to atmosphere, as in the machine illustrated in the aforementioned U.S. patent application Ser. No. 293,959, to bleed the air out of the cavities 24 at a controlled rate corresponding to the displacement of air within the cavities as the plug assists 37 move into them. When the piston rod 26 reaches the upper limit of its travel, cylinder 41' is operated to expand links 42' and 43', and when links 49' and 50' have reached a dead-center position the lower mold assembly 31 is locked in sealed position against the plastic web P. At this time air under pressure is admitted through air line 36 to the air box 34 and at the same time the line 60 is communicated with a suitable vacuum pump so that a differential pressure is created on opposite sides of the portions of the plastic web P which have been moved into cavities 24, and these portions of the plastic are caused to move into intimate engagement with the cavity liners 24. The air is introduced through ports 75 above the seal produced at the squeezing surfaces 76 and 76a. Because the cavity liners 24 are relatively cool, the plastic moved into intimate engagement with them tends to set virtually instantaneously and lines 36 and 60 may be opened immediately to atmosphere to relieve the differential pressure system on opposite sides of the plastic web P.

Cylinder 41' is then operated to move the links 49' and 50' from dead-center position and cylinder 25 is then operated to retract the male mold assembly 31. The clamp frame 78 remains in engagement with the plastic web P as the plug assists 37 are retracted during the initial part of the retracting stroke because of the pressure developed in the cylinders 79. However, during the remainder of the retracting stroke the pressure in cylinders 79 will be relieved with downward movement of the cylinders 79, and the clamp frame 78 will also be retracted from engagement with the plastic web P. It is when the clamp frame 78 clears the plastic web P that the cylinders 41 and 13 are then operated in sequence to respectively unlock and withdraw the upper mold assembly 19. As the upper mold assembly 19 is withdrawing, a source of air under pressure is communicated with pipe 60 to aid in the removal of the parts from the cavity members 24. The entire cycle requires onyl two or three seconds and it will be apparent that the machinery described is high production machinery which has a very high productive capacity.

The plug assists 37 resemble the mold cavity liners 24 in shape and, generally speaking, are in the range of 8% to 15% smaller and preferably have a penetration in the neighborhood of 90% to 95% of cavity depth to obtain the bottom thickness desired. Best results in forming such parts are obtained with plug assist which have a height greater than the depth of the cavity and the plate 65 obviates the disadvantage of using plug assists 37 of greater height than the cavities by preventing downward ballooning of the plastic portions surrounding the cavities. It has been determined that when the plastic is prestretched by the plug assists 37, up to twice the amount of material can be taken out of the generally horizontal portions of the plastic web P surrounding the cavities 24 than with conventional equipment. Further, webbing or warping of the material between the plug assist members 37 is prevented because the plate 65 prevents the ballooning which otherwise occurs. A more positive control of the plastic web P is obtained by cooling the portions of the plastic web surrounding the squeezing ring surfaces 76 and 76a on the plug assist 37 and liners 24, respectively, and distortion of the lip 11 which is formed is prevented. The cooled plate 65 makes it possible to set the plastic lips 11 formed in a condition of reduced thickness under production conditions. Because squeezing occurs just prior to the time that the differential pressure system is employed to move the plastic web portions from the plug assists 37 to the walls of the liners 24, most of the material eliminated when squeezing occurs moves into the walls of the containers which are formed. At the time squeezing occurs, the plastic web portions surrounding the plug assist members 37 and squeezing ring surfaces 76 are relatively cool and set compared to the portions of the plastic web which have been moved into the cavities 24 by the plug assists 37 and are still in engagement with the plug assists 37. As noted, the plug assists 37 are preferably maintained at about the temperature of the plastic introduced to the forming zone, to avoid leaving drag-off or chill marks or blemishes on the containers formed.

A control system for the machine is disclosed in the aforementioned application Ser. 293,959 and is incorporated by reference.

It is to be understood that the drawings and descriptive matter are in all cases to be interpreted as merely illustrative of the principles of the invention, rather than as limiting the same in any way, since it is contemplated that various changes may be made in the various elements to achieve like results without departing from the spirit of the invention or the scope of the appended claims.

I claim:

1. Differential pressure plastic sheet forming apparatus comprising: a female mold assembly having a plurality of cavities therein; a male mold assembly including extending plug assist members aligned with said cavities; means for supporting a heated deformable plastic sheet between said assemblies; means for moving said male mold assembly and said female mold assembly relatively to cause said plug to assist members to move portions of the plastic into the cavities; means for creating a differential pressure on opposite sides of said portions of the plastic to draw them into forming engagement with said cavities; and temperature controlled plate means mounted by said male mold assembly intermediate the ends of said extending plug assist members in position to be engaged by other portions of the sheet surrounding said first mentioned portions when the plug assist members move into said cavities.

2. The combination defined in claim 1 in which said plug assist members have reduced size sections entering said cavities and registering generally laterally extending squeezing ring surfaces are provided at the mouths of said cavities and at the bases of said sections intermediate the ends of said plug assist members in position to squeeze the plastic to form lip portions of reduced thickness relative to the walls of the parts formed in the cavities; said registering surfaces being so disposed with relation to said means for moving said male mold assembly toward the female mold assembly that squeezing occurs prior to the time said male mold assembly completes its movement toward the female mold assembly.

3. The combination defined in claim 2 in which said squeezing ring surfaces taper relative to the axes of said plug assist members.

4. The combination defined in claim 3 in which the said plate means is tubular and has openings through which said portions of the plug assist members beyond said squeezing ring surfaces extend, said plug assist members being circumferentially spaced from marginal walls of said openings.

5. The combination defined in claim 4 in which means is provided for circulating a liquid coolant through said plate means.

6. The combination defined in claim 4 in which said plug assist members are heated.

7. The combination defined in claim 4 in which said male mold assembly has an air box from which said plug assist members extend and insulating supports on said air box between said plug assist members support aid plate means.

8. The combination defined in claim 7 in which certain of said supports are tubular to admit and drain coolant.

9. The combination defined in claim 8 in which supply and drain tubes extend through said tubular supports.

10. The combination defined in claim 1 in which said plate means comprises an outer and an inner plate with a serpentine passageway in said outer plate connecting with a supply and drain port in said inner plate.

11. Differential pressure plastic web forming apparatus comprising: a female mold assembly having a plurality of cavities therein with generally laterally extending plastic web squeezing surfaces adjacent the mouths thereof; a male mold assembly including extending plug assist members aligned with said cavities; means for supporting a heated deformable plastic web between said assemblies; means for moving said male mold assembly and female mold assembly relatively to cause said plug assist members to move portions of the plastic into the cavities and to generally leave a normal predetermined web space between said male and female mold assemblies; and means for creating a differential pressure on opposite sides of said portions of the plastic to draw them into forming engagement with said cavities; said plug assist members having reduced size sections entering said cavities and generally laterally extending squeezing surfaces provided near the bases of said sections opposite said generally laterally extending squeezing surfaces on the female mold assembly in position to cooperate with said squeezing surfaces on the female mold assembly to squeeze the plastic to form lip portions of reduced thickness relative to the walls of the parts formed in the cavities; and said opposed squeezing surfaces being so located as to leave less space between them than said normal web space when said plug assist members have completed their movement into said cavities.

12. The combination defined in claim 11 wherein cooled temperature controlling surface means surrounds said squeezing ring surfaces at the bases of said plug assist members.

13. The combination defined in claim 11 wherein said surface means is tubular; and means circulates a coolant therethrough.

14. A method of differential pressure forming a synthetic thermoplastic plastic sheet into parts such as containers comprising: prestretching portions of a heated deformable plastic sheet while moving them into mold cavities; squeezing plastic web sections surrounding said portions to a reduced thickness relative to said portions and thereby increasing the thickness of said portions; and then creating a differential pressure on opposite sides of said plastic sheet of such character as to draw said portions into intimate engagement with said mold cavities; and removing the parts formed from the mold cavities.

15. The method defined in claim 14 in which portions of the plastic sheet surrounding said sections are cooled during said squeezing.

16. The method defined in claim 15 in which said prestretching occurs when said portions which are prestretched are engaged by a heated surface and said cooling occurs when said portions which are cooled are contacted by a cooled surface.

17. A method of differential pressure forming a synthetic thermoplastic plastic sheet into plastic parts such as containers comprising: prestretching portions of a heated deformable plastic sheet having a pressure and a vacuum side while moving them into mold cavities; contacting sections of the pressure side of the plastic around said portions with a cooled surface restraining the sections from ballooning and maintaining them relatively flat; creating a differential pressure condition on opposite sides of said sheet drawing said portions into intimate engagement with said mold cavities; and removing the parts formed from the mold cavities.

18. The combination defined in claim 2 in which air ports in said plug assist members are outward of said squeezing ring surfaces.

19. Differential pressure plastic sheet forming apparatus comprising: a female mold assembly having a plurality of cavities therein; a male mold assembly including extending plug assist members aligned with said cavities; means for supporting a heated deformable plastic sheet between said assemblies; means for moving said male mold assembly and said female mold assembly relatively to cause said plug assist members to move into said cavities and move portions of the plastic into the cavities; means for creating a differential pressure on opposite sides of said portions of the plastic to draw them into forming engagement with said cavities; and a plate, with a generally flat sheet engaging outer surface, having a plurality of separated bores therein through which said plug assists can freely extend, mounted by said male mold assembly and disposed intermediate the ends of said extending plug assist members when the male mold assembly plug assist members are moved into said cavities in position to be engaged by other portions of the sheet surrounding said first mentioned portions and prevent ballooning thereof.

20. Differential pressure apparatus for forming a synthetic plastic sheet into plastic parts such as containers comprising: a frame system; a female mold assembly having mold cavities supported thereon; a male mold assembly supported by said frame system and including plug assists aligned with said mold cavities; means on said frame system for supporting a heated deformable plastic sheet between said female mold assembly and male mold assembly; means on said frame system for moving said male mold assembly and female mold assembly relatively to cause said plug assists to move into said cavities and move portions of the plastic into the cavities; temperature controlled cooled surface incorporated with said male mold assembly, operable for contacting sections of the plastic sheet around said portions and restraining the sections from ballooning when the plug assists move into said cavities, maintaining the sections relatively flat while cooling them; and means for creating a differential pressure on opposite sides of said sheet and drawing said portions into intimate engagement with said mold cavities.

21. The combination defined in claim 20 wherein said temperature controlled surface is supported on said male mold assembly by thermal insulation members.

22. The combination defined in claim 21 in which said temperature controlled surface comprises a tubular plate having enlarged openings through which said plug assists extend, said plug assists being perimetrally spaced from said plate and having air ports therein; and said means for creating a differential pressure includes means for supplying air under pressure to said ports.

References Cited

UNITED STATES PATENTS

| | | | |
|---|---|---|---|
| 2,967,328 | 1/1961 | Shelby et al. | 18—19 |
| 3,193,881 | 6/1965 | Kostur | 18—19 |
| 3,341,895 | 9/1967 | Shelby | 18—19 |
| 3,346,923 | 10/1967 | Brown et al. | 18—19 |

WILLIAM J. STEPHENSON, Primary Examiner